3,390,124
EPOXY RESINS CURED BY NOVEL
POLYAMINES
John B. Kittridge, White Bear Lake, Minn., and Albert L.
Micchelli, Newark, N.J., assignors to Minnesota Mining and Manufacturing Company, St. Paul, Minn., a corporation of Delaware
No Drawing. Original application Feb. 28, 1962, Ser. No. 176,428. Divided and this application Aug. 19, 1965, Ser. No. 493,296
1 Claim. (Cl. 260—47)

This application is a division of our copending application Ser. No. 176,428, filed Feb. 28, 1962.

This invention relates to the preparation of new and useful phenolic polyamines and their use as co-reactants for epoxy resins.

In this invention, there is taught a new class of polyamines which contain a phenolic nucleus. These compounds react with the epoxide linkages of the epoxy resins more rapidly than those polyamines commonly used as co-reactants for epoxy resins. Furthermore, the phenolic nucleus of the polyamine becomes an integral part of the cured epoxy resin. These cured epoxy resins have excellent chemical resistance and electrical properties. Additional advantages of these compounds as co-reactants for epoxy resins reside in their low volatility and toxicity.

In general, these phenolic polyamines are prepared by reacting a polyamine with a phenolic-containing carboxylic acid. The phenol-containing carboxylic acid is prepared by the alkylation of a phenol with a carboxylic acid. The easiest and more economical alkylation is the addition of an unsaturated carboxylic acid or compounds readily derived from these acids to the phenol, although known techniques for the metathesis of other carboxylic acids and their derivatives to the phenol nucleus are available.

Compounds which accomplish these objects and advantages have the structural formula

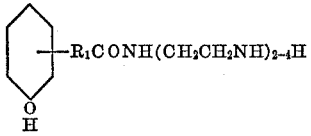

where $R_1$ is a divalent straight-chain hydrocarbon radical, linking the phenolic nucleus and the terminal carboxyl group. The dilavent straight-chain hydrocarbon radical may be saturated or unsaturated and may be branched chain.

It has also been discovered that in the preparation of these polyamines it is possible to select intermediates which result in a relative flexible cured epoxy resin. For this purpose, the acid used to prepare the polyamine is preferably an unsaturated fatty acid such as oleic, linoleic and linolenic or a source high in content of these acids such as the fatty acids derived from tall oil. In this manner polyamines of the formula,

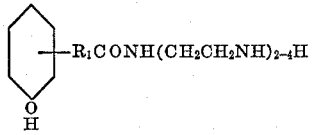

where $R_1$ is a seventeen-carbon hydrocarbon radical, are produced.

An especially preferred class is prepared using phenolic compounds found in cashew nut shell liquid to react with the unsaturated acid and polyamine to produce compounds of the formula

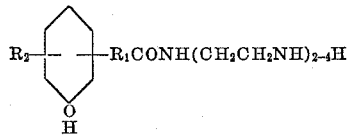

where $R_1$ and $R_2$ are straight-chain hydrocarbon radicals and the sum of the carbon atoms in $R_2$ and $R_1$ is at least 16 and most preferably 32, such as when an unsaturated fatty acid is also employed as an intermediate.

Phenols useful as intermediates include phenol, cresols, alkyl-phenol, resorcinol, Bisphenol A, and cashew nut shell liquid. Cashew nut shell liquid is a natural product which varies in reactivity depending upon the source and processing treatment. Basically, it is a mixture of meta-substituted phenols, the substituents being a 15-carbon side chain containng 0 to 3 non-conjugated double bonds.

Unsaturated acids useful as intermediates include the above-enumerated fatty acids, acrylic acid, methacrylic undecylenic acid, and so forth.

Polyamines useful as intermediates include diethylenetriamine, triethylenetetramine, tetraethylenepentamine, and so forth. These polyamines have the general structural formula $$NH_2(CH_2CH_2NH)_{2-4}H$$

As employed in this specification, the term "epoxy resin" relates to poly-epoxide compounds which contain reactive vicinal epoxy linkages available as reaction sites. One type of epoxy resin which has enjoyed a high degree of commercial success is prepared from epichlorohydrin and polyhydric phenols, such as 2,2'-bis-(p-hydroxy phenyl) propane (Bis-phenol A), resorcinol, and polyhydric novolak. A second class of epoxy resins is prepared from polyhydric alcohols such as glycerine and pentaerythritol and epichlorohydrin. Another class of epoxy resins is prepared from epichlorohydrin and amines containing reactive hydrogen atoms. A still further class of epoxy resins is prepared by the direct epoxidation of aliphatic or aromatic unsaturated compounds. These resins and compositions containing these resins are classified by the Patent Office in Class 260, sub-classes 2, 42, 47, and 348, and reference thereto may be had for the early patents as well as the most recent patent publications on current developments in this field.

Because the above-mentioned classes of compounds are currently enjoying greater and greater commercial successes, it is recognized that other epoxy resins containing an average vicinal epoxy group content of more than 1 will be developed that are useful in the practice of this invention. As with those epoxy resins, presently available, the preferred compounds are those containing more than 1 and less than 3 vicinal epoxy groups per molecule and mixtures containing a preponderance of these compounds.

It may also be desirable to add filler to the compositions of this invention. Among those fillers useful in the practice of this invention are talc, silica, alumina, steel chips, steel filings, aluminum flake, calcium carbonate, thixotropic agents, fibrous fillers such as asbestos and chopped glass, and various other fillers commonly employed in combination with epoxy resins.

It is also contemplated that these co-reactants may be used in combination with conventional curing agents such as amines, anhydrides, mercaptans, and so forth. Likewise, if additional acceleration is required, conventional epoxy resin accelerators, such as tertiary amines, may be added.

In general, the phenolic polyamines of this invention are employed in a weight ratio of from one part by weight phenolic polyamine to 10 parts by weight epoxy resin and 2 parts by weight phenolic polyamine to one part by weight epoxy resin. The preferred ratio is one part by weight phenolic polyamine to 1 to 2 parts by weight epoxy resin when the phenolic polyamine is used as the sole co-reactant.

This invention may be illustrated further by reference to the following examples in which all "parts" are expressed as parts by weight and all "percentages" are expressed as percent by weight, unless specified otherwise.

Example I

Cashew nut shell liquid (50 parts by weight), tall oil fatty acid pitch (50 parts by weight), and litharge (1 part by weight) were polymerized at 500° F., for 23½ hours at which time the fluidity of the mixture was 15.5 cm./130° F. as measured by melting a sample at 130° F. and determining its flow down an 85° incline over a period of one minute. Toluene (45 parts by weight) and diethylenetriamine (18.1 parts by weight) were added to the reaction mixture (105 parts by weight) which was refluxed for 6 hours during which time the water of reaction was removed by azeotropic distillation. The resulting phenolic-polyamine was stripped of toluene.

A mixture of this phenolic-polyamine (224 parts by weight) and an epoxy resin, a reaction product of Bisphenol A and epichlorohydrin having an epoxy equivalency of 190 (190 parts by weight), were cured for 4 hours at 115° C. After being immersed in water and 15% aqueous acetic acid for seven days, the percent absorption of the samples as measured by their increase in weight was 0.55% and 8.30%, respectively.

Example II

Acid-washed cashew nut shell liquid (750 parts by weight), a mixture of $C_{18}$ unsaturated fatty acids (750 parts by weight) and cresol sulfonic acid (90 parts by weight) were polymerized at 300° F. for 6½ hours at which time a viscosity of 19,300 centipoises at 25° C. was observed. The resulting carboxyl-phenol (532 parts by weight) and triethylenetetramine (171 parts by weight) were reacted at 300° F. for 2 hours in the presence of toluene (300 parts by weight) so as to remove by azeotropic distillation the water of reaction formed during the formation of amide linkages. The toluene was then stripped by vacuum from the resulting high molecular weight phenolic-polyamine which had a viscosity of 22,300 centipoises.

Example III

Acid-washed cashew nut shell liquid (750 parts by weight) and a mixture of unsaturated fatty acids (750 parts by weight) and cresol sulfonic acid (90 parts by weight) were polymerized at 300° F. for 3 hours at which time a viscosity of 10,200 centipoises at 25° C. was observed. The resulting carboxyl-phenol (358 parts by weight) and triethylenetetramine (171 parts by weight) were reacted at 300° F., for 2 hours in the presence of toluene (300 parts by weight) so as to remove by azeotropic distillation the water of reaction formed during the formation of amide linkages. The toluene was then stripped by vacuum from the resulting high molecular weight phenolic-polyamine which had a viscosity of 4,060 centipoises. This phenolic-polyamine reacted at room temperature with epoxy resin. For example, Epon 828, an epoxy resin product of Shell Chemical Company (75 grams) and 25 grams of the phenolic-polyamine were cured for 16 hours at room temperature to produce a patty having a Shore D hardness of 60. By changing the ratio to 55 parts by weight epoxy resin to 45 parts phenolic-polyamine, a Shore D hardness of 70 was obtained.

Example IV

A phenolic mixture comprising 50% o-cresol, 45% phenol, and 5% alkylated phenol (966 parts by weight) and $BF_3$-phenol complex (19 parts by weight) were mixed in a suitable vessel and heated to 40° C. A tall oil fatty acid mixture, having an acid number of 190 (592 parts by weight), was added over a period of one hour. During the first half hour of addition, the temperature in the vessel was maintained at 40° C.; during the second half hour the temperature was raised slowly to 49° C. When the addition was completed, the temperature of the reactants was raised to 66° C. and held for one hour, then raised to 93° C. and held for one hour. Unreacted materials were removed by distillation under vacuum at a pot temperature of 300° F./15 mm. Hg. The yield was 800 grams of the phenol-acid condensate which contained 26% by weight bound phenol.

The phenol-acid-condensate (480 parts by weight) was dissolved in toluene (120 parts by weight) and triethylenetetramine (219 parts by weight) was added. The mixture was heated to reflux and over a period of 2½ hours one mole of water per mole of carboxyl group was collected in a Dean and Stark trap. The product was then stripped of toluene under vacuum at a pot temperature of 300° F./40 mm. Hg.

TABLE I

| | Co-reactant | | | | | | | | | | | |
|---|---|---|---|---|---|---|---|---|---|---|---|---|
| | Phenolic-Polyamine | | | | | | Unreacted Acid and Polyamine | | | | | |
| Parts by weight co-reactant | 40 | 40 | 40 | 80 | 80 | 80 | 40 | 40 | 40 | 80 | 80 | 80 |
| Part by weight accelerator | 0 | 2 | 4 | 0 | 2 | 4 | 0 | 2 | 4 | 0 | 2 | 4 |
| Immersion in toluene for 24 hours: | | | | | | | | | | | | |
| Hardness:[1] | | | | | | | | | | | | |
| Original | 79 | 80 | 80 | 79 | 79 | 78 | 77 | 77 | 80 | 71 | 73 | 70 |
| Final | 66 | 80 | 80 | 79 | 78 | 78 | 35 | 73 | 78 | 30 | 29 | 30 |
| Absorption[2] | 6.66 | 0.25 | 0.34 | 0.58 | 0.75 | 0.69 | F | 3.71 | 0.60 | F | F | F |
| Immersion in xylene, isopropanol and naphtha:[3] | | | | | | | | | | | | |
| Hardness:[1] | | | | | | | | | | | | |
| Original | 79 | 80 | 80 | 79 | 79 | 79 | 77 | 77 | 79 | 72 | 72 | 72 |
| Final | 65 | 71 | 70 | 69 | 65 | 64 | 49 | 62 | 67 | 49 | 49 | 49 |
| Absorption[2] | 7.06 | 3.73 | 4.41 | 4.58 | 4.83 | 6.21 | F | 7.09 | 5.32 | F | F | F |

F Failed test.
[1] Shore D.
[2] Percent by weight increase after immersion.
[3] Equal volume of each.

Table I shows the results of reacting an epoxy resin prepared from iBsphenol-A and epichlorohydrin having an epoxy equivalency of 180 (100 parts by weight) with the phenolic-polyamines of this example in the indicated amounts. Also included in Table I is comparative data of cured epoxy resins prepared from the phenolic-acid and polyamine mixture used to prepare the phenolic-polyamine of this example. In those samples where an acceleration was added, the accelerator was 2,4,6-tri (dimethyl amino methyl) phenol. All samples were cured at room temperature for 16 hours and then post-cured at 140° F. for two hours.

Example V

A phenolic mixture comprising 50% o-cresol, 45% phenol and 5% alkylated phenol (966 parts by weight), a tall oil fatty acid mixture with an acid number of 190

(148 parts by weight), and triethylenetetramine (85 parts by weight) were dissolved in toluene (38 parts by weight). The mixture was heated to reflux over a period of two hours whereby one mole of water per mole of carboxyl group was collected in a Dean and Stark trap. The toluene was removed under vacuum at a pot temperature of 300° F./40 mm. Hg. The resulting phenolic-polyamine was found to be an effective coreactant for epoxy resins.

As co-reactions for epoxy resins, the phenolic-polyamine compositions of this invention are useful as adhesive and potting and casting resins. Those phenolic-polyamines having the ability to impart flexibility to the cured epoxy resin are useful in epoxy resin compositions employed to repair automobile panels.

We claim:
1. A composition comprising a polyamine terminated phenol having the structural formula

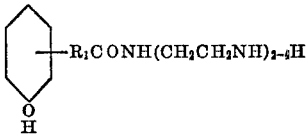

where $R_1$ is a hydrocarbon radical and an epoxy resin having a plurality of vicinal epoxide groups.

No references cited.

WILLIAM H. SHORT, *Primary Examiner.*

T. D. KERWIN, *Assistant Examiner.*

UNITED STATES PATENT OFFICE

CERTIFICATE OF CORRECTION

Patent No. 3,390,124 June 25, 1968

John B. Kittredge et al.

It is certified that error appears in the above identified patent and that said Letters Patent are hereby corrected as shown below:

In the heading to the printed specification, line 4, "John B. Kittridge" should read -- John B. Kittredge --.

Signed and sealed this 2nd day of December 1969.

(SEAL)
Attest:

Edward M. Fletcher, Jr.
Attesting Officer

WILLIAM E. SCHUYLER, JR.
Commissioner of Patents